United States Patent
Cerqueira et al.

(10) Patent No.: US 11,511,853 B2
(45) Date of Patent: Nov. 29, 2022

(54) METHOD AND A DEVICE FOR ASSISTING THE PILOTING OF A HYBRID ROTORCRAFT HAVING A LIFT ROTOR AND AT LEAST ONE PROPULSION ROTOR GENERATING THRUST

(71) Applicant: AIRBUS HELICOPTERS, Marignane (FR)

(72) Inventors: Stephane Cerqueira, Aix en Provence (FR); Guillaume Dumur, Salon de Provence (FR); Anthony Leonard, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 688 days.

(21) Appl. No.: 16/582,002

(22) Filed: Sep. 25, 2019

(65) Prior Publication Data

US 2020/0094952 A1    Mar. 26, 2020

(30) Foreign Application Priority Data

Sep. 26, 2018    (FR) ........................................ 1800994

(51) Int. Cl.
   *B64C 27/08*    (2006.01)
   *B64D 43/00*    (2006.01)
   *B64C 27/22*    (2006.01)

(52) U.S. Cl.
   CPC .............. *B64C 27/08* (2013.01); *B64C 27/22* (2013.01); *B64D 43/00* (2013.01)

(58) Field of Classification Search
   CPC .......... G05D 1/00; G05D 1/02; G05D 1/0202; G01D 7/00; B64C 27/00; B64C 27/08;
   (Continued)

(56) References Cited

U.S. PATENT DOCUMENTS 6,195,598 B1    2/2001    Bosqui et al.
9,409,655 B1 *  8/2016    Vallart ................... B64C 27/57
(Continued)

FOREIGN PATENT DOCUMENTS

EP    1562022 A1    8/2005
EP    2258615 A1    12/2010
(Continued)

OTHER PUBLICATIONS

NPL Search.*
French Search Report and Written Opinion for Application No. 18 00994, dated May 23, 2019, 10 Pages.

*Primary Examiner* — Van T Trieu
(74) *Attorney, Agent, or Firm* — Brooks Kushman P.C.

(57) ABSTRACT

A method of facilitating the piloting of a hybrid rotorcraft that comprises a lift rotor and at least one propulsion rotor together with at least one engine operating in compliance with at least one rating. For at least one rating, onboard calculator determines a first power margin of the power plant that is available for the lift rotor and at least one second power margin that is available for said at least one propulsion rotor. A single indicator displays a line together with a first index pointing to said line to illustrate a current operating point of the lift rotor, and a second index pointing to said line to illustrate a current operating point of said at least one propulsion rotor. For each monitored rating, a first symbol is spaced apart from the first index by a first distance illustrating the first power margin. A second symbol is spaced apart from the second index by a second distance illustrating the second power margin.

14 Claims, 3 Drawing Sheets

(58) Field of Classification Search
CPC ......... B64C 27/12; B64C 27/22; B64C 27/26;
B64C 27/28; B64C 27/54; B64C 27/57;
B64C 27/82; B64C 29/00; B64C 29/0025;
B64D 27/00; B64D 27/02; B64D 27/24;
B64D 35/00; B64D 35/04; B64D 35/08;
B64D 43/00; B64D 45/00
See application file for complete search history.

(56) References Cited

U.S. PATENT DOCUMENTS

| | | | |
|---|---|---|---|
| 11,001,390 B2* | 5/2021 | Kuster | ............... B64D 27/24 |
| 2010/0312421 A1 | 12/2010 | Eglin | |
| 2012/0153072 A1* | 6/2012 | Eglin | ............... B64C 27/26 |
| | | | 244/17.13 |
| 2012/0253560 A1 | 10/2012 | Corpron et al. | |
| 2020/0401142 A1* | 12/2020 | Abdelli | ............... B64D 43/00 |

FOREIGN PATENT DOCUMENTS

| | | |
|---|---|---|
| FR | 2756256 A1 | 5/1998 |
| FR | 2946322 A1 | 12/2010 |
| FR | 2973340 A1 | 10/2012 |

* cited by examiner

METHOD AND A DEVICE FOR ASSISTING THE PILOTING OF A HYBRID ROTORCRAFT HAVING A LIFT ROTOR AND AT LEAST ONE PROPULSION ROTOR GENERATING THRUST

CROSS-REFERENCE TO RELATED APPLICATIONS

This application claims priority to French patent application No. FR 1800994 filed on Sep. 26, 2018, the disclosure of which is incorporated in its entirety by reference herein.

BACKGROUND OF THE INVENTION

(1) Field of the Invention

The present invention relates to a method and to a device for assisting piloting a hybrid rotorcraft having a lift rotor and at least one propulsion rotor generating thrust.

(2) Description of Related Art

A helicopter has at least one rotary wing that is rotated by a power plant. The power plant may comprise at least one engine and at least one main power transmission gearbox (MGB). Limits of an engine and limits of a transmission gearbox can serve to define various operating ratings, and in particular:

a takeoff rating defined by a maximum takeoff power TOP and by a predetermined duration of use for this maximum takeoff power;

a maximum continuous power rating defined by a maximum continuous power MCP, e.g. corresponding to about 90% of the maximum takeoff power TOP, and by a duration of use for this maximum continuous power that is generally unlimited;

an extended power rating defined by an extended power that is substantially equivalent or equal to the maximum takeoff power TOP and by a predetermined duration of use for this extended power; and a transient rating defined by a maximum transient power MTP.

On a multi-engined rotorcraft, the operating envelope also includes contingency ratings that, are used only when one of the engines has failed:

a first contingency rating defined by a supercontingency power, often equal to about 112% to 120% of the maximum takeoff power TOP, and by a predetermined duration of use for this rating that may be 30 seconds, this supercontingency rating being referred to as "30 seconds one engine inoperative" (30 sec OEI), and being conventionally usable three times during a flight;

a second contingency rating, defined by a maximum power equal to about 105% to 112% of the maximum takeoff power TOP and by a predetermined duration of use for this contingency rating that may be 2 minutes, referred to as 2 min OEI; and a third contingency rating, defined by a maximum power that is substantially equal to maximum takeoff power TOP and by a duration for use of this rating that is unlimited for the remainder of the flight after the engine failure and referred to as continuous OEI (cont-OEI).

In agreement with the helicopter manufacturer, an engine manufacturer defines limits for each engine in order to obtain the above-mentioned powers TOP, MCP, MTP, 30 sec OEI, 2 min OEI, and cont-OEI corresponding to each of the above-mentioned ratings and involving an acceptable lifetime. On a turboshaft engine, these limits are generally monitored by means of three monitoring parameters of the engine: the speed of rotation of the gas generator of the engine, the engine torque, and the temperature of the gas at the inlet to the low pressure free turbine of the engine, respectively written Ng, Cm, and T45 by the person skilled in the art. If the engine has a high pressure turbine stage, it is also possible to use the temperature of the gas at the inlet to the high pressure turbine, written TET.

Thus, for each rating in the operating envelope of the engine, the manufacturer draws up limits for each monitoring parameter of the engine.

For example, for an aircraft having a single turboshaft engine, the manufacturer determines:

temperature limits $T4_{limMCP}$, $T4_{limTOP}$, and $T4_{limMTP}$ corresponding to the maximum temperature of the gas at the inlet to the low pressure free turbine of the engine while the engine is developing respectively its maximum continuous power, its maximum takeoff power, and its maximum transient power, these temperature limits varying as a function of outside conditions;

speed of rotation limits $NG_{limMCP}$, $NG_{limTOP}$, and $NG_{limMTP}$ corresponding to the speed of rotation of the gas generator of the engine while the engine is developing respectively its maximum continuous power, its maximum takeoff power, and its maximum transient power, these speed of rotation limits being variable as a function of outside conditions; and torque limits $TQ_{limMCP}$, $TQ_{limTOP}$, and $TQ_{limMTP}$ corresponding to the torque exerted on the outlet shaft of the engine while the engine is developing respectively its maximum continuous power, its maximum takeoff power, and its maximum transient power, these torque limits being variable as a function of outside conditions.

These various limits are established by the engine manufacturer together with the aircraft builder in the form of tables, databases, or equations, for example.

In order to monitor these limits, the aircraft may include multiple indicators, each indicator supplying information about, a single parameter.

In order to limit the number of indicators, a first limit indicator (FLI) may be used.

Document FR 2 756 256 suggests presenting the power margin available from the engine prior to reaching one of these limits on a scale that is graduated in equivalent collective pitch of the blades of the main rotor, which scale moves past an index representative of the current collective pitch of said blades. For example, if the index is in register with a first graduation, the limit of the limiting parameter of the engine at a given power is in register with a second graduation. The pilot then knows the collective pitch margin that is available prior to reaching said given power.

Document EP 1 562 022 is also known.

Furthermore, in the context of this invention, another type of rotorcraft is referred to for convenience as a "hybrid rotorcraft". A hybrid rotorcraft comprises a fuselage carrying at least one rotary wing having a lift rotor. The lift rotor contributes at least to providing the aircraft with lift and possibly also with propulsion. Specifically, the lift rotor generates a rotor force that can be resolved into a lift force and a propulsion force depending on its angle of inclination.

In order to achieve a high speed of advance, a hybrid helicopter has at least one propulsion rotor generating thrust.

For example, a hybrid rotorcraft may have two propulsion rotors, referred to as "lateral" rotors, that are arranged on either side of the fuselage.

The two propulsion rotors and the lift rotor are driven in rotation by a power plant. The power plant comprises at least one engine and a mechanical system interconnecting the rotary elements. Such a mechanical interconnection system may comprise at least one transmission gearbox, at least one shaft and coupling members, . . . .

Like a helicopter, a hybrid rotorcraft may have first control means and second control means for controlling the pitch of the blades of the lift rotor, respectively collectively and cyclically.

Furthermore, a hybrid rotorcraft includes at least one thrust control means suitable for modifying the pitch of the blades of the propulsion rotors collectively and by the same amount.

Anti-torque functions and yaw control can be performed by using a control for differentially controlling the thrusts exerted by the propulsion rotors, e.g. by the pilot making use of pedals.

Modifying the pitch of the blades of the lift rotor and of the propulsion rotors has an impact on the operation of the power plant and in particular on the engine.

Under such circumstances, the first limit indicator instruments of a helicopter are not suitable for providing a device for assisting the piloting of a hybrid rotorcraft that possesses not only a lift rotor but also at least one propulsion rotor.

Document FR 2 946 322 describes a method of assisting the piloting of an aircraft having a lift rotor and two propulsion rotors. That method includes steps of determining a maximum mean pitch for the propulsion rotors as a function of a power gradient and of displaying that maximum mean pitch on a dedicated indicator on a scale that is graduated in pitch with a pointer sweeping over it.

That teaching is advantageous, but on a hybrid rotorcraft it amounts to using multiple indicators and in particular to using an indicator that is dedicated to the propulsion rotors.

Likewise, Document FR 2 973 340 suggests an indicator displaying a diagram that presents a current collective pitch of each propulsion rotor and a power limit curve.

BRIEF SUMMARY OF THE INVENTION

An object of the present invention is thus to propose a device for assisting piloting that makes it easier to pilot a hybrid rotorcraft so as to optimize its performance and/or its safety.

The invention thus provides in particular a method of facilitating the piloting of a hybrid rotorcraft, said hybrid rotorcraft having a lift rotor with a plurality of first blades having a first pitch that is variable at least for contributing to providing the hybrid rotorcraft with lift, the hybrid rotorcraft having a propulsion system having at least one propulsion rotor provided with a plurality of second blades having a second pitch that is variable for contributing at least to causing the hybrid rotorcraft to advance, said hybrid rotorcraft having a power plant provided with at least one engine operating at at least one rating for rotating said lift rotor and each propulsion rotor of the at least one propulsion rotor, said at least one rating being associated with at least one limit for at least one monitoring parameter of the power plant.

The method comprises the steps of:

for at least one "monitored" rating of the at least one rating, using onboard calculation means/calculator to determine a first power margin of the power plant that is available for the lift rotor, and at least one second power margin of the power plant that is available for said at least one propulsion rotor;

displaying a line on a single indicator to separate a first side and a second side of the indicator;

displaying, on said single indicator, a first index pointing to said line to illustrate a current operating point for the lift rotor, and displaying, on said single indicator, a second index pointing to said line to illustrate a second current operating point for said at least one propulsion rotor; and for each monitored rating, displaying, under the control of said onboard calculator, a first symbol spaced apart from the first index by a first distance illustrating the first power margin for the monitored rating, and displaying, under the control of said onboard calculator, a second symbol comprising at least one pointer spaced apart from the second index by a second distance illustrating at least one second power margin for the monitored rating.

The term "first power margin of the power plant that is available for the lift rotor" designates a power margin of the power plant that can be used by the lift rotor. Likewise, the term "second power margin of the power plant that is available for said at least one propulsion rotor" designates a power margin of the power plant that can be used by at least one propulsion rotor.

Consequently, the method is applicable to a rotorcraft having multiple rotors. In particular, the rotorcraft may have at least one lift rotor and at least one propulsion rotor, and for example it may have two or more propulsion rotors. Each propulsion rotor may be a pusher or a puller propulsion rotor. Each propulsion rotor may be a lateral rotor, i.e. a rotor that is arranged laterally relative to a fuselage.

The plurality of ratings may comprises at least one of the following ratings: a takeoff rating, a maximum continuous rating, an extended power rating, a transient rating, a first contingency rating, a second contingency rating, and a third contingency rating. The monitoring parameters may include an engine torque, a temperature, and/or a speed of rotation. For example, for a turboshaft engine, the monitoring parameters may include at least one parameter selected from a list comprising: the speed of rotation of a gas generator of the engine; the engine torque from the engine; and the temperature of the gas at the inlet to a free turbine of the engine. By way of example, in order to determine the engine torque, it is possible to measure and make use of the torque exerted on a main power transmission gearbox (MGB) of the power plant that is interposed between an engine and a rotor.

Under such circumstances, the method proposes making use of a single indicator that presents a common symbol for various pieces of equipment that are controlled in various ways. In particular, the line displayed by the indicator may represent a power axis both for the lift rotor and for the propulsion system. The line need not have any graduations, or it may be graduated. Optionally, the line may carry different graduations on the first side and on the second side, which graduations are specific respectively to the lift rotor and to the propulsion system.

Thus, the first side, the second side, and the line together form a single indicator, and not two different indicators.

In the method, the onboard calculator calculates power margins that are available for the lift rotor and, for the propulsion rotor(s). This step serves to evaluate the power reserve that can be used by the lift rotor and the power reserve that can be used by the propulsion system, and thus by the propulsion rotor(s), prior to reaching a limit of the rotorcraft, namely in particular a limit of the power plant that drives the lift rotor and each propulsion rotor in rotation.

Under such circumstances, the onboard calculator transmits a signal to the screen in order to illustrate both lift rotor and propulsion rotor power margins by means or various symbols on a single indicator and with reference to a single line.

Thus, a first index is displayed that represents a current operating point of the lift rotor, and for example it illustrates the power being consumed by the lift rotor at a current instant. This first index points to the line, either touching the line or being directed towards the line.

A second index is also displayed that represents a current operating point of the propulsion system, and for example it illustrates the power being consumed by the propulsion rotor(s) at a current instant. This second index points to the line, either touching the line or being directed towards the line.

In addition, for each monitored rating, the calculator operates so as to display a symbol serving to visualize the available power margin. Under such circumstances, a "first" symbol is positioned that relates to the first power margin. The first symbol points to the line, either touching it or being directed towards the line. Likewise, a "second" symbol is positioned representing the propulsion rotor pitch limit, this second symbol relates to a second power margin, and for example at least the smallest of the second power margins. The second symbol points to the line, either touching it or being directed towards the line.

For example, three first symbols and three second symbols may be used to illustrate the limits that are not to be exceeded in order to comply with the predetermined conditions for the takeoff rating, for the maximum continuous rating, and for the extended power rating, as described above.

The method thus enables a pilot to observe a single indicator in order to monitor members that are not only different, namely the lift rotor and the propulsion rotors, but that are also controlled by members that are likewise different.

The method may also include one or more of the following characteristics.

In an aspect, the indicator line may be a straight line segment, a circular arc, . . . .

In an aspect, the first index and the first symbol associated with each monitored rating may be positioned on the first side, the second index and the second symbol associated with each monitored rating being positioned on the second side.

Under such circumstances, the single indicator has a line that represents a central axis, possibly a power axis with graduations. On either side of the line, symbols are generated and displayed in order to show the first power margin and the second power margin.

In an aspect, the step of determining a first power margin using the onboard calculator comprises the following steps for a given monitored rating:

determining an engine torque margin for each engine of the at least one engine;

determining an intermediate torque margin between a rotor torque limit of a rotor shaft rotating the lift rotor and a current torque exerted on said rotor shaft, the rotor torque limit possibly being a predetermined limit;

determining a minimum rotor torque margin corresponding to the minimum from among the engine torque margin and the intermediate torque margin; and determining the first power margin equal to the minimum rotor torque margin multiplied by the speed of rotation of an engine outlet shaft driven in rotation by the engine that presents the smallest torque margin.

The term "engine outlet shaft" may cover a member of the drive train going from an engine to a rotor, and in particular a power shaft of the engine or indeed a shaft of the power plant that is driven by such a power shaft, and for example a shaft that is interposed between a transmission gearbox and the engine, or an inlet shaft to such a transmission gearbox.

Optionally, a step of determining an engine torque margin for each engine may comprise the following steps:

determining a monitoring margin for each monitoring parameter of the engine between a current value of the monitoring parameter and a predetermined limit for said monitoring parameter in the monitored rating; and for each monitoring parameter that is not the engine torque, and that is thus not already expressed in engine torque units, transforming the monitoring margin into a margin expressed in engine torque units, the engine torque margin being the smallest of the margins expressed in engine torque units.

Each predetermined limit may vary in flight, e.g. as a function of outside pressure and outside temperature, or else it may be constant.

Each monitoring margin may be transformed into a margin that is expressed in engine torque units by applying stored mathematical relationships, e.g. drawn up by testing and/or simulation, by using tables of values, . . . . Since the engine torque monitoring margin is naturally expressed in engine torque units, there is no need for this monitoring margin to be transformed in order to be compared with the other monitoring margins.

In a first alternative, the step of determining at least one second power margin may comprise the following steps:

determining an engine torque margin for each engine of the at least one engine;

determining, for each propulsion rotor, a calculation torque margin between a propulsion rotor torque limit of a propulsion rotor shaft rotating the propulsion rotor and a current torque exerted on said propulsion rotor shaft;

determining a minimum propulsion rotor torque margin corresponding to the minimum from among the engine torque margin and each calculation torque margin; and determining a second power margin equal to the minimum propulsion rotor torque margin multiplied by the speed of rotation of an engine outlet shaft driven in rotation by the engine presenting the smallest torque margin.

Whatever the number of propulsion rotors, a single second power margin is calculated in this first alternative, the second index being positioned solely as a function of this second power margin.

In a second alternative, the step of determining at least one second power margin may comprise the following steps:

determining an engine torque margin for each engine of the at least one engine;

determining, for each propulsion, rotor, a calculation torque margin between a propulsion rotor torque limit of a propulsion rotor shaft rotating the propulsion rotor and a current torque exerted on said propulsion rotor shaft;

determining, for each propulsion rotor, a minimum propulsion rotor torque margin corresponding to the minimum from among the engine torque margin and the calculation torque margin associated with the propulsion rotor; and determining a second power margin for each propulsion rotor equal to the minimum propulsion rotor torque margin of the propulsion rotor multiplied by the speed of rotation of an engine outlet shaft driven in rotation by the engine presenting the smallest torque margin.

Optionally, the second index, comprises a single pointer that is positioned as function of the smallest second power margin, or else one pointer for each propulsion rotor that is positioned as a function of the corresponding second power margin.

In a first implementation, said first index and said second index may be stationary relative to the line, said first symbol and said second symbol being movable relative to the line.

In an aspect, said first index and said second index may be in alignment, said first index and said second index being arranged symmetrically about the line.

In this first implementation, the indices representing the current operating points of the blades of the lift rotor and of the propulsion rotors are in alignment and they are stationary. The first symbols and the second symbols slide along the line as a function of how the various margins vary.

This makes it easy to identify visually the margins that are available.

By way of illustration, if a pilot increases the thrust generated by the propulsion rotors, the power margin of the power plant for a given rating decreases. Each second symbol moves in a direction going from the second symbol towards the second index. Likewise, each first symbol moves in a direction going from the first symbol towards the first index.

In a second implementation, the first index and the second index may be movable relative to the line, said first symbol and said second symbol being stationary relative to the line.

In, this second implementation, the symbols illustrating the limits are stationary and it is the indices that slide relative to the line.

Once more it is easy to identify visually the margins that are available.

Optionally, for a given monitored rating, said first symbol and said second symbol may be in alignment, said first symbol and said second symbol being arranged symmetrically about the line.

Visually identifying the margins that are available is then optimized.

In an aspect, said at least one propulsion rotor comprises a plurality of propulsion rotors, and said at least one propulsion rotor margin may have one propulsion rotor margin for each propulsion rotor, said second index then comprising one pointer for each propulsion rotor, which pointer is spaced apart from the second symbol by a distance illustrating the corresponding propulsion rotor margin.

Under such circumstances, the second index is split into a plurality of distinct portions. It is then possible to distinguish between the propulsion rotors, e.g. to make it easier to take into consideration a propulsion rotor that is suitable for reversing the direction of the thrust it exerts.

In an aspect, said first symbol and said second symbol are identical in shape.

In an aspect, said first symbol and said second symbol are at least temporarily asymmetrically arranged relative to the line.

In addition to a method, the invention provides a hybrid rotorcraft. Said hybrid rotorcraft comprises a lift rotor with a plurality of first blades having a first pitch that is variable at least for contributing to providing the hybrid rotorcraft with lift, the hybrid rotorcraft having a propulsion system having at least one propulsion rotor provided with a plurality of second blades having a second pitch that is variable for contributing at least to causing the hybrid rotorcraft to advance, said hybrid rotorcraft having a power plant provided with at least one engine operating at at least one rating for rotating said lift rotor and the or each propulsion rotor, said at least one rating being associated with at least one limit for at least one monitoring parameter of the power plant.

The hybrid rotorcraft may include onboard calculator and an indicator configured to apply the above-described method.

BRIEF DESCRIPTION OF THE DRAWINGS

The invention and its advantages appear in greater detail from the following description of examples given by way of illustration and with reference to the accompanying figures, in which.

DETAILED DESCRIPTION OF THE INVENTION

Elements present in more than one of the figures are given the same references in each of them.

Figure 1:
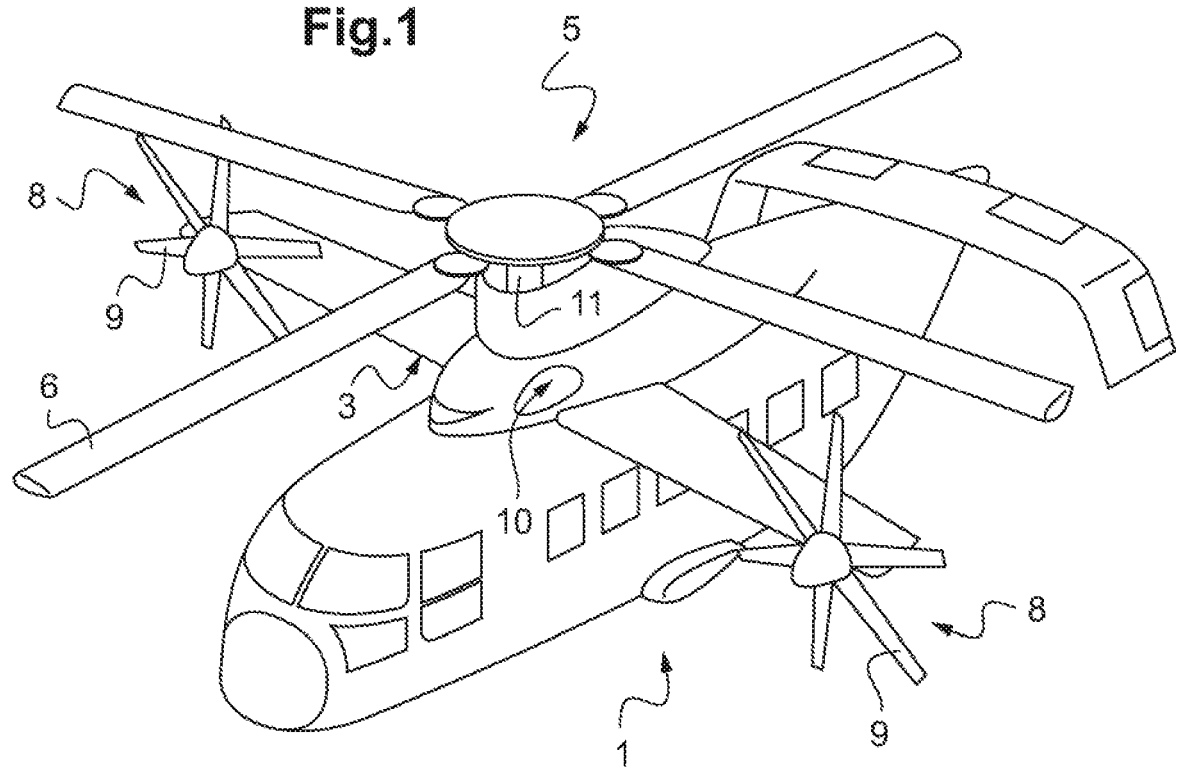
FIG. 1 is an isometric view of a hybrid rotorcraft.

FIG. 1 shows a hybrid rotorcraft 1 of the invention provided with a main rotor (MR) constituting a lift rotor 5 having a plurality of first blades 6 presenting a first collective pitch that is variable. The hybrid rotorcraft 1 is also provided with a propulsion system 7. The propulsion system 7 includes at least one propulsion rotor 8, e.g. of the propeller type, comprising a plurality of second blades 9 having a second collective pitch that is variable.

By way of example, the hybrid rotorcraft 1 has a fuselage 2 carrying at least one rotary wing, the rotary wing including the lift rotor carrying the first blades 6. Furthermore, the hybrid rotorcraft includes a first propulsion rotor and a second propulsion rotor. By way of example, the two propulsion rotors 8 are lateral rotors, possibly arranged at each of the outer ends of a wing 3.

In order to drive rotation of the lift rotor and of each propulsion rotor 8, the aircraft includes a power plant having at least one engine 10, e.g. of the turboshaft type. Furthermore, the power plant may include an, interconnection system 11 comprising at least one main power transmission gearbox (MGB), at least one transmission shaft, . . . .

The speeds of rotation of the outlet shafts of the engines 10, of the propulsion rotors 8, of the lift rotor 5, and of the mechanical interconnection system 11 may optionally be proportional to one another, with the proportionality ratio being variable or constant regardless of the flight configuration of the hybrid helicopter under normal operating conditions of the integrated drive train.

In addition, each engine 10 operates in compliance with an operating envelope that includes one or more ratings, e.g. comprising a takeoff rating defining a maximum takeoff power TOP, a maximum continuous rating defining a maximum continuous power MCP, a transient rating defining a maximum transient power MTP, a first contingency rating defining a supercontingency power 30 sec OEI, a second contingency rating defining a second contingency power 2 min OEI, and/or a third contingency rating defining a continuous contingency power cont-OEI.

In order to control the hybrid rotorcraft, the pilot may have a thrust control serving to modify the mean pitch of the second blades of the propulsion rotors 8.

More precisely, the thrust control acts identically on the pitch of the second blades 9 in order to obtain collective variation of the pitch of the second blades. For example, the pilot may request an increase of 5 degrees in the mean pitch of all of the blades of the propulsion rotors in order to increase the resultant thrust generated in particular by the first propulsion rotor and by the second propulsion rotor, the mean pitch of the blades of the first and second propulsion rotors possibly being equal to half the sum of the pitches of the first and second propulsion rotors 8.

The thrust control may comprise a thrust control lever (TCL) that acts on a drive train connected to the second blades of the propulsion rotors.

As an alternative, or in addition, the thrust control may optionally be provided with a button suitable for controlling at least one actuator arranged on said drive train. This button advantageously has three positions, namely a first position for increasing the mean pitch of the blades of the propulsion rotors, and thus collectively varying the pitch of the second blades 9 by the same amount, a second position for decreasing the collective pitch of the second blades 9, and finally a third position for leaving the pitch of the second blades 9 unmodified.

In order to control the yaw attitude of the hybrid rotorcraft, the pilot may have a yaw control device provided with Yaw control means, conventionally pedals, for giving rise to variation in the pitch of the second blades 9 that is not collective but instead different or even differential.

Finally, the hybrid rotorcraft 1 has conventional control means for controlling the pitch of the first blades 6 of the lift rotor 5 both collectively and cyclically.

In order to avoid risking maneuvers that might endanger the aircraft, the aircraft is provided with a piloting assistance device.

Figure 2:
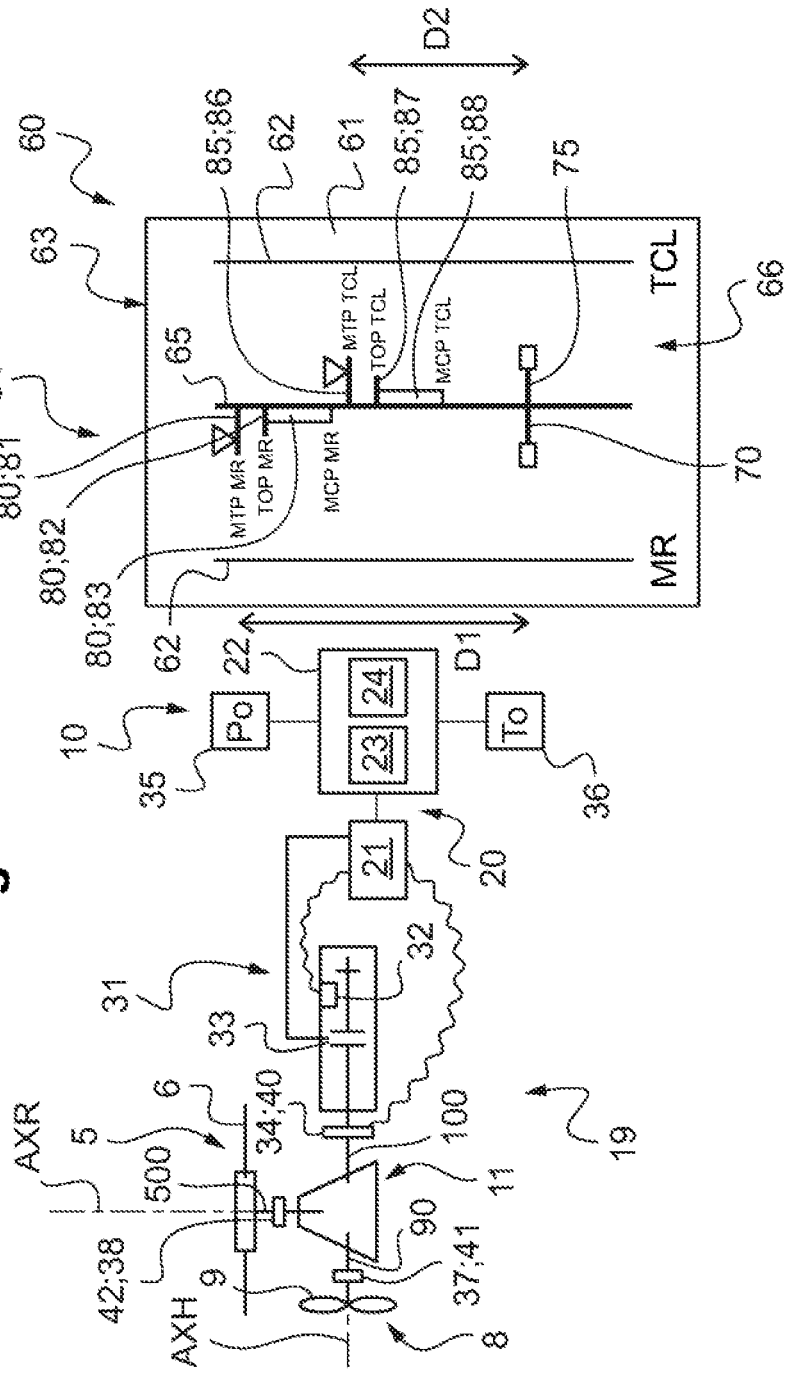
FIG. 2 is a diagram showing a device for assisting the piloting of such a hybrid rotorcraft.

FIG. 2 shows such a piloting assistance device 15 in accordance with the invention.

The piloting assistance device 15 comprises onboard calculator 20.

The onboard calculator 20 may comprise one or more computers communicating with one another.

Furthermore, the piloting assistance device 15 includes an indicator 60 controlled by the onboard calculator and a plurality of sensors 30 connected to the onboard calculator.

In the example shown, the onboard calculator 20 comprises a central computer 22 and a conventional engine computer 21 for each engine.

By way of example, such an engine computer is of the type known under the acronym FADEC (for full-authority digital engine control). Each engine computer is then connected to at least one engine sensor. By way of example, such an engine computer may regulate an electric motor or it may regulate a fuel-burning engine by controlling its fuel metering unit. For each operating rating, such an engine computer can, also deliver the power margin available from the engine (or motor) relative to the maximum power of that rating, and it can deliver a current value for the power being consumed by the engine (or motor).

In another example, single calculator may be used.

By way of example, each calculator may comprise at least one processor 23 and at least one memory 24, at least one integrated circuit, at least one programmable system, at least one logic circuit, these examples not being limiting on the scope to be given to the term "calculator" or "calculator means".

Under such circumstances, the onboard calculator 20 is connected by wired or wireless connections to sensors 31 for measuring monitoring parameters of each engine 10. For example, each engine computer 21 is connected a set of engine sensors. The monitoring parameters of an engine may include at least one parameter selected from a list comprising: the speed of rotation Ng of a gas generator of each engine; the torque TQ of each engine; and a gas temperature, e.g. the temperature of the gas at the inlet to a low pressure free turbine of each engine, written T45.

Under such circumstances, for each engine, the piloting assistance device 15 possesses a sensor 32 for measuring the speed of rotation Ng of the engine, a torque meter 34 for measuring the torque TQ developed by the engine on an engine outlet shaft 100 driven by the engine, and a sensor 33 for measuring the engine gas temperature T45. An engine speed of rotation sensor 40 may serve to measure the speed of rotation of the engine outlet shaft.

Furthermore, the piloting assistance device 15 may include a sensor 35 for sensing outside pressure P0 and a sensor 36 for sensing outside temperature T0, which sensors are connected to the onboard calculator 20, and for example to the central computer 22.

Furthermore, the onboard calculator 20, for example the central computer, may be connected to a propulsion rotor torque meter 37 for each propulsion rotor. Each propulsion rotor torque meter 37 serves to measure torque on a propulsion rotor shaft 90 driving the propulsion rotor in rotation about its axis of rotation AXH. A sensor for sensing the speed of rotation of the propulsion rotor 41 may serve to measure the speed of the rotation of the propulsion rotor shaft.

The onboard calculator 20, and for example the central computer, may be connected to a rotor torque meter 38. The rotor torque meter may measure torque on a rotor shaft 500 driving rotation of the lift rotor 5 about its axis of rotation AXR. A rotor speed of rotation sensor 42 can measure the speed of rotation of the rotor shaft 500.

The onboard calculator 20, and for example the central computer, may be connected to a mean pitch sensor measuring the current mean pitch of the blades of the propulsion rotor blades and/or to an air speed sensor suitable for measuring the true air speed of the hybrid helicopter and/or to a rotary speed sensor for measuring the speed of rotation of the propulsion rotors and/or to a rotary speed sensor for measuring the speed of rotation of the life rotor and/or to a pitch sensor for measuring the collective pitch of the blades of the lift rotor.

In the method of the invention performed by the device 10, for at least one operating rating of the engine referred to for convenience as the "monitored" rating, the onboard calculator 20 determines a first power margin MRGPROT relating to the maximum power MAXP that can be developed in this rating.

For example, the onboard calculator determines, for each engine, an engine torque margin that corresponds to equal to the power margin of the engine converted into units of torque.

Optionally, each rating specifies a stored limit that is not to be exceeded for each monitoring parameter. Under such circumstances, the engine computer of an engine determines the "monitoring" margin between a current value of each monitoring parameter and its limit. Where appropriate, the monitoring margin is converted by the engine computer into a comparison margin expressed in engine torque units by applying stored relationships or the equivalent.

For example, the engine computer determines a T45 temperature margin that is converted into a margin expressed in torque units, an Ng speed of rotation margin that is converted into another margin expressed in torque units, and an engine torque margin which is naturally expressed in torque units. The smallest of the margins expressed in torque units represents the torque margin of the engine in question.

In addition, the onboard calculator 20 may calculate an intermediate torque margin between a stored limit for the rotor torque of the rotor shaft 500 and the current torque exerted on said rotor shaft 500.

The onboard calculator 20 can then determine a minimum rotor torque margin, which is equal to the minimum from among each of the engine torque margins and the intermediate torque margin.

Independently of this aspect, the onboard calculator 20 determines one or more second power margins for the power plant.

The onboard calculator then determines, for each propulsion rotor, a "calculation" torque margin between a stored propulsion rotor torque limit for a propulsion rotor shaft 90 driving rotation of the propulsion rotor and a current torque exerted on that propulsion rotor shaft 90 as measured by a propulsion rotor torque meter 37.

In, a first alternative, a single second power margin is calculated.

Under such circumstances, the onboard calculator determines a minimum propulsion rotor torque margin corresponding to equal to the minimum among each of the engine torque margins and each of the calculation torque margins. The onboard calculator then determines a single second power margin that is equal to the minimum propulsion rotor torque margin multiplied by the speed of rotation of an engine outlet shaft 100 driven in rotation by the engine that presents the smallest torque margin.

In a second alternative, a second power margin is calculated for each propulsion rotor.

Under such circumstances, the onboard calculator determines, for each propulsion rotor, a minimum propulsion rotor torque margin corresponding to equal to the minimum from each of the engine torque margins and the calculation torque margin of this propulsion rotor. The onboard calculator then determines a second power margin for each propulsion rotor equal to the minimum propulsion rotor torque margin of that propulsion rotor multiplied by the speed of rotation of an engine outlet shaft driven in rotation, by the engine presenting the smallest torque margin.

Whatever the alternative, the onboard calculator, and for example the central computer, calculates for each monitored rating a first power margin. MRGPROT that represents a power reserve of the power plant that can be used by the lift rotor. In addition, the onboard calculator, and for example the central computer, calculates for each monitored rating at least one second power margin MRGPHEL that represents a power margin of the power plant that can be used by at least one propulsion rotor.

Under such circumstances, the onboard calculator, and for example the central computer, transmits at least one signal to an indicator 60 to generate and display various symbols on a screen 61 of the indicator.

Optionally, the onboard calculator may cause two parallel vertical bars 62 to be displayed so as to define horizontally a display zone 63.

Furthermore, the onboard calculator may cause a line 65 to be generated and displayed, in the display zone 63, if any, to separate a first side 64 of the indicator 60 from a second side 66. By way of example, the information concerning the lift or main rotor (MR) may be displayed on the first side 64 while the information concerning the propulsion rotors and the thrust control lever (TCL) may be displayed on the second side 66.

The onboard calculator may cause a first index 70 to be generated and displayed in the display zone 63, if any, on the first side 64. This first index 70 points to a line 65 in order to illustrate the current operating point of the lift rotor, and for example the power being consumed by the lift rotor.

Optionally, the onboard calculator calculates the power being consumed by the lift rotor by multiplying the rotor torque exerted on the rotor shaft 500 by the speed of rotation of the rotor shaft, as measured respectively the rotor torque meter 38 and by the rotor rotary speed sensor. Alternatively, the onboard calculator calculates the power being consumed by the lift rotor by using stored polar plots and parameters of the lift rotor, such as the radius of the first blades, the tip speed of the blades of the lift rotor, the air speed of the aircraft, the pitch of the first blades, . . . .

The onboard calculator may cause a second index 75 to be generated and displayed, in the display zone 63, if any, on the second side 66. This second index 75 points to the line 65 in order to illustrate a current operating point of the propulsion rotor(s), and for example the power being consumed by the propulsion rotor(s).

Optionally, the onboard calculator may calculate the power consumed by each propulsion rotor by multiplying the propulsion, rotor torque exerted on the propulsion rotor shaft 90 by the speed of rotation of the propulsion rotor shaft 90, as measured respectively by the propulsion rotor torque meter 37 and by the propulsion rotor rotary speed sensor 41. Alternatively, the onboard calculator calculates the power consumed by each propulsion rotor by using stored polar plots and propulsion rotor parameters such as the radius of the second blades, the tip speed of the blades of the propulsion rotor, the air speed of the aircraft, the pitch of the second blades, . . . .

For each monitored rating, the onboard calculator may cause a first symbol 80 to be generated and displayed in the first side 64 and spaced apart from the first index 70 by a first distance D1 illustrating the first power margin at this monitored rating. In the example shown, the onboard calculator may generate a first symbol 81 for illustrating the first power margin for the transient rating MTP and a first symbol 82 for illustrating the first power margin for the extended power rating and a first symbol for illustrating the first power margin for the maximum continuous rating.

For each monitored rating, the onboard calculator may cause a second symbol 85 to be generated and displayed in the second side 66 and spaced apart from the second index 75 by a second distance D2 illustrating at least one second power margin for this monitored rating. In the example shown, the onboard calculator may generate a second symbol 86 for illustrating the smallest second power margin for the transient rating MTP and a second symbol 87 for illustrating the smallest second power margin for the extended power rating and a second symbol 88 for illustrating the smallest second power margin for the maximum continuous rating.

In the embodiment shown in FIG. 2, the onboard calculator may position the first index 70 and then for each monitored rating it may shift the first symbol 80 relative to the first index 70 as a function of how the first power margin varies. Likewise, the onboard calculator may position the second index 75, and then for each monitored rating it may shift the second symbol relative to the second index 75 as a function of how the smallest second power margin varies.

The first index 70 and the second index 75 are stationary relative to the line 65. However, the first symbols 80 and the second symbols 85 are movable relative to the line 65.

Optionally, the first index 70 and the second index 75 are in alignment and/or arranged symmetrically about the line 65.

Figure 3:
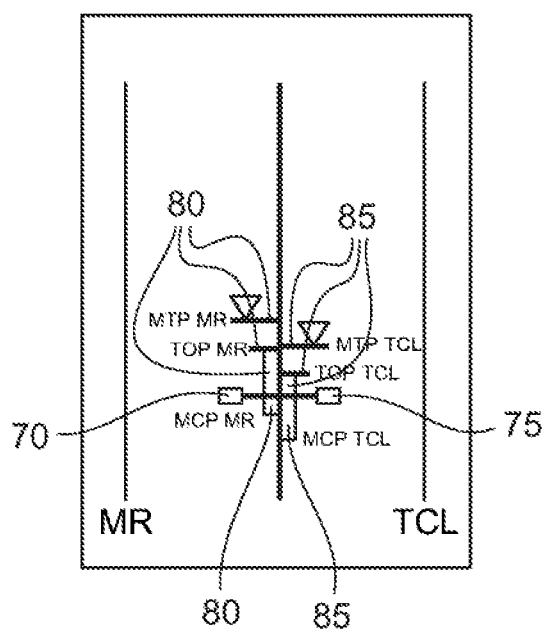
FIGS. 3 to 5 show the method of the invention.

By way of example, and with reference to FIG. 3, when the Pilot changes the Pitch of the second blades of the propulsion rotors, the various margins become smaller. The first symbols and the second symbols move in the same direction.

Figure 4:
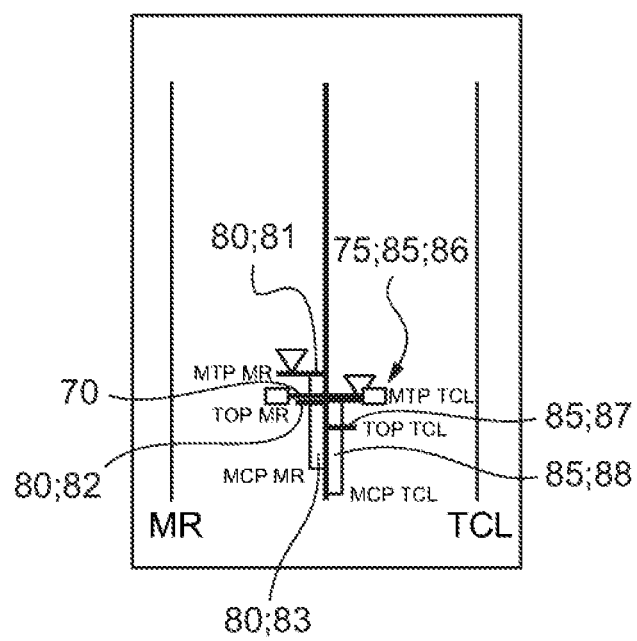

FIG. 4 shows a situation in which the pilot no longer has any power margin for the propulsion rotors, but still has some power margin, for the lift rotor.

Figure 5:
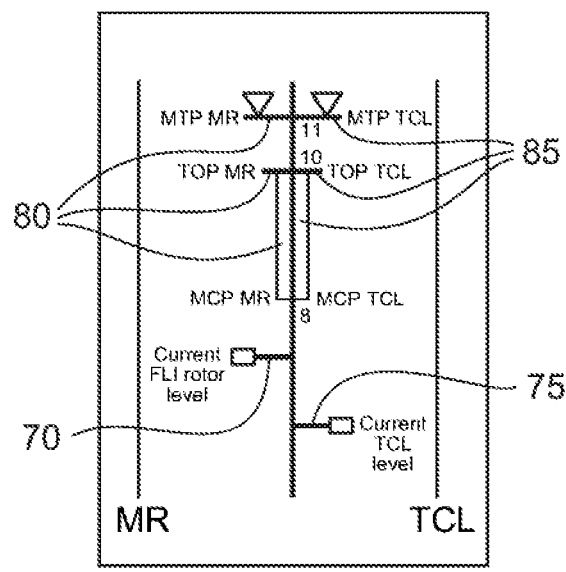

In the embodiment of FIG. 5, the first index 70 and the second index 75 are movable relative to the line 65. However the first symbols 80 and the second symbols 85 are stationary relative to the line 65.

Optionally, for each monitored rating, the first symbol 80 and the second symbol 85 are in alignment and/or are arranged symmetrically about the line 65.

Figure 6:
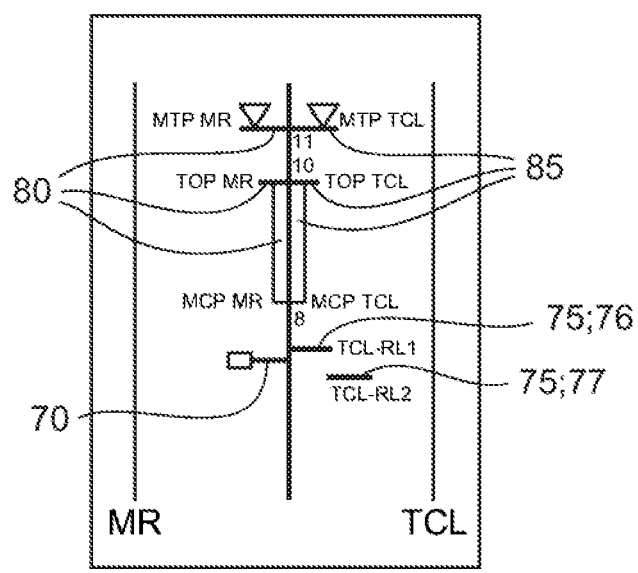

In the variant of FIG. 6, the onboard calculator distinguish between the propulsion rotors.

Under such circumstances, the onboard calculator calculates a propulsion rotor margin for each propulsion rotor.

Furthermore, the second index 75 presents a respective pointer 76, 77 for each propulsion rotor, each pointer 76, 77 being spaced apart from the second symbol by a distance that illustrates the margin, for the corresponding propulsion rotor.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of facilitating the piloting of a hybrid rotorcraft, the hybrid rotorcraft having a lift rotor with a plurality of first blades having a first pitch that is variable at least for contributing to providing the hybrid rotorcraft with lift, the hybrid rotorcraft having a propulsion system having at least one propulsion rotor provided with a plurality of second blades having a second pitch that is variable for contributing at least to causing the hybrid rotorcraft to advance, the hybrid rotorcraft having a power plant provided with at least one engine operating at at least one rating for rotating the lift rotor and each propulsion rotor of the at least one propulsion rotor, the at least one rating being associated with at least one limit for at least one monitoring parameter of the power plant, wherein the method comprises the steps of:

for at least one monitored rating of at least one rating, using onboard calculator to determine a first power margin of the power plant that is available for the lift rotor, and at least one second power margin of the power plant that is available for the at least one propulsion rotor;

displaying a line on a single indicator to separate a first side and a second side of the indicator;

displaying, on the single indicator, a first index pointing to the line to illustrate a current operating point for the lift rotor, and displaying, on the single indicator, a second index pointing to the line to illustrate a second current operating point for the at least one propulsion rotor; and for each monitored rating, displaying, under the control of the onboard calculator, a first symbol spaced apart from the first index by a first distance illustrating the first power margin for the monitored rating, and displaying, under the control of the onboard calculator, a second symbol comprising at least one pointer spaced apart from the second index by a second distance illustrating at least one second power margin for the monitored rating.

2. The method according to claim 1, wherein the first index and the first symbol associated with each monitored rating are positioned on the first side, the second index and the second symbol associated with each monitored rating being positioned on the second side.

3. The method according to claim 1, wherein the step of determining a first power margin comprises the following steps:

determining an engine torque margin for each engine of the at least one engine;

determining an intermediate torque margin between a rotor torque limit of a rotor shaft rotating the lift rotor and a current torque exerted on the rotor shaft;

determining a minimum rotor torque margin corresponding to the minimum from among the engine torque margin and the intermediate torque margin; and determining the first power margin equal to the minimum rotor torque margin multiplied by the speed of rotation of an engine outlet shaft driven in rotation by the engine that presents the smallest torque margin.

4. The method according to claim 3, wherein the step of determining an engine torque margin for each engine comprises the following steps:

determining a monitoring margin for each monitoring parameter of the engine between a current value of the monitoring parameter and a predetermined limit for the monitoring parameter in the monitored rating; and for each monitoring parameter that is not the engine torque, transforming the monitoring margin into a margin expressed in engine torque units, the engine torque margin being the smallest of the margins expressed in engine torque units.

5. The method according to claim 3, wherein the step of determining at least one second power margin comprises the following steps:

determining an engine torque margin for the or each engine;

determining, for each propulsion rotor, a calculation torque margin between a propulsion rotor torque limit of a propulsion rotor shaft rotating the propulsion rotor and a current torque exerted on the propulsion rotor shaft;

determining a minimum propulsion rotor torque margin corresponding to the minimum from among the engine torque margin and each calculation torque margin; and determining a single second power margin equal to the minimum propulsion rotor torque margin multiplied by the speed of rotation of an engine outlet shaft driven in rotation by the engine presenting the smallest torque margin.

6. The method according to claim 3, wherein the step of determining at least one second power margin comprises the following steps:

determining an engine torque margin for each engine of the at least one engine;

determining, for each propulsion rotor, a calculation torque margin between a propulsion rotor torque limit of a propulsion rotor shaft rotating the propulsion rotor and a current torque exerted on the propulsion rotor shaft;

determining, for each propulsion rotor, a minimum propulsion rotor torque margin corresponding to the minimum from among the engine torque margin and the calculation torque margin associated with the propulsion rotor; and determining a second power margin for each propulsion rotor equal to the minimum propulsion rotor torque margin of the propulsion rotor multiplied by the speed of rotation of an engine outlet shaft rotated by the engine presenting the smallest torque margin.

7. The method according to claim 1, wherein the first index and the second index are stationary relative to the line, the first symbol and the second symbol being movable relative to the line.

8. The method according to claim 7, wherein the first index and the second index are in alignment, the first index and the second index being arranged symmetrically about the line.

9. The method according to claim 1, wherein the first index and the second index are movable relative to the line, the first symbol and the second symbol being stationary relative to the line.

10. The method according to claim 9, wherein for a given monitored rating, the first symbol and the second symbol are in alignment, the first symbol and the second symbol being arranged symmetrically about the line.

11. The method according to claim 1, wherein the at least one propulsion rotor comprises a plurality of propulsion rotors, and the second power margin(s) includes one propulsion rotor margin for each propulsion rotor, the second index comprises one pointer for each propulsion rotor, which pointer is spaced apart from the second symbol by a second distance illustrating the corresponding second power margin.

12. The method according to claim 1, wherein the first symbol and the second symbol are identical in shape.

13. The method according to claim 1, wherein the first symbol and the second symbol are at least temporarily asymmetrically arranged relative to the line.

14. A hybrid rotorcraft, the hybrid rotorcraft having a lift rotor with a plurality of first blades having a first pitch that is variable at least for contributing to providing the hybrid rotorcraft with lift, the hybrid rotorcraft having a propulsion system having at least one propulsion roto provided with a plurality of second blades having a second pitch that is variable for contributing at least to causing the hybrid rotorcraft to advance, the hybrid rotorcraft having a power plant provided with at least one engine operating at at least one rating for rotating the lift rotor and the or each propulsion rotor, the rating(s) being associated with at least one limit for at least one monitoring parameter of the power plant, wherein the hybrid rotorcraft includes onboard calculator and an indicator that are configured to apply the method according to claim 1.

\* \* \* \* \*